US012684396B2

(12) United States Patent
Guo et al.

(10) Patent No.: US 12,684,396 B2
(45) Date of Patent: Jul. 14, 2026

(54) CORE NETWORK ELEMENT, ACCESS-NETWORK DEVICE, AND TERMINAL DEVICE

(71) Applicant: GUANGDONG OPPO MOBILE TELECOMMUNICATIONS CORP., LTD., Dongguan (CN)

(72) Inventors: Yali Guo, Dongguan (CN); Xinlei Yu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 286 days.

(21) Appl. No.: 18/626,441

(22) Filed: Apr. 4, 2024

(65) Prior Publication Data

US 2024/0284228 A1      Aug. 22, 2024

Related U.S. Application Data

(63) Continuation of application No. PCT/CN2021/123146, filed on Oct. 11, 2021.

(51) Int. Cl.
| | |
|---|---|
| *H04W 64/00* | (2009.01) |
| *H04W 24/10* | (2009.01) |
| *H04W 28/088* | (2023.01) |
| *H04W 24/04* | (2009.01) |

(52) U.S. Cl.
CPC ......... *H04W 24/10* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 2016/0100378 A1* | 4/2016 | Chang | H04W 48/16 455/456.5 |
| 2020/0404604 A1 | 12/2020 | Hande et al. | |
| 2024/0284506 A1* | 8/2024 | Zhang | H04W 74/0808 |
| 2024/0314821 A1* | 9/2024 | Yu | G01S 5/02 |
| 2024/0324032 A1* | 9/2024 | Li | H04W 4/38 |

(Continued)

FOREIGN PATENT DOCUMENTS

| | | |
|---|---|---|
| CN | 112969209 | 6/2021 |
| WO | 2021197489 | 10/2021 |

OTHER PUBLICATIONS

6G Wireless Systems: A Vision, Architectural Elements, and Future Directions. Khan et al. IEEE. (Year: 2020).*

(Continued)

*Primary Examiner* — Venkat Perungavoor
(74) *Attorney, Agent, or Firm* — Hodgson Russ LLP

(57) ABSTRACT

A core network element, an access-network device, and a terminal device are provided. The core network element includes a transceiver, a memory configured to store computer programs, and a processor configured to execute the computer programs to: cause the transceiver to receive a first sensing instruction from a first core network element, wherein the first sensing instruction instructs the core network element to control an access-network device and/or a terminal device to perform a target sensing task; and control, according to the first sensing instruction, the access-network device and/or the terminal device to perform the target sensing task.

20 Claims, 9 Drawing Sheets

(56) References Cited

U.S. PATENT DOCUMENTS

2024/0340780 A1* 10/2024 Yu ......................... H04L 5/0048

OTHER PUBLICATIONS

Huawei et al., "New SID: 5G Architecture enhancements for Harmonized Communication and Sensing service," 3GPP TSG-WG SA2 Meeting #146e-meeting, S2-2106022 (revision of S2-210xxxx), Aug. 2021.

Xiaomi, "New SID on Study on Sensing based services," 3GPP TSG SA2 Meeting #146E (e-meeting), S2-2106378, Aug. 2021.

WIPO, International Search Report and Written Opinion for International Application No. PCT/CN2021/123146, Jul. 11, 2022.

* cited by examiner

DEVICE 120

CORE NETWORK ELEMENT, ACCESS-NETWORK DEVICE, AND TERMINAL DEVICE

CROSS-REFERENCE TO RELATED APPLICATION(S)

This application is a continuation of International Application No. PCT/CN2021/123146, filed Oct. 11, 2021, the entire disclosure of which is incorporated herein by reference.

TECHNICAL FIELD

Embodiments of the disclosure relate to the field of communication technology, and more particularly, to a core network element, an access-network device, and a terminal device.

BACKGROUND

A current cellular network is used only for communication, but actually, a radio electromagnetic wave signal used by a cellular network not only can be used for wireless data transmission and communication but also has environment sensing capability, such as user action or gesture recognition, breathing monitoring, terminal moving speed measurement, environment imaging, and weather monitoring.

In addition to communication and data transmission, a future cellular network may also be considered to be used for obtaining sensing data. Therefore, how to perform sensing control is a problem that needs further study.

SUMMARY

According to an aspect of embodiments of the disclosure, a core network element is provided. The core network element includes a transceiver, a memory configured to store computer programs, and a processor coupled to the transceiver and configured to execute the computer programs stored in the memory to: cause the transceiver to receive a first sensing instruction from a first core network element, where the first sensing instruction instructs the second core network element to control an access-network device and/or a terminal device to perform a target sensing task; and control, according to the first sensing instruction, the access-network device and/or the terminal device to perform the target sensing task.

According to an aspect of embodiments of the disclosure, an access-network device is provided. The access-network device includes a transceiver, a memory configured to store computer programs, and a processor coupled to the transceiver and configured to execute the computer programs stored in the memory to: cause the transceiver to receive a target sensing instruction from a second core network element, where the target sensing instruction instructs the access-network device to perform a sensing operation related to a target sensing task; and perform the sensing operation according to the target sensing instruction to obtain sensing data related to the target sensing task.

According to an aspect of embodiments of the disclosure, a terminal device is provided. The terminal device is a target terminal device and includes a transceiver, a memory configured to store computer programs, and a processor coupled to the transceiver and configured to execute the computer programs stored in the memory to: cause the transceiver to receive a fourth sensing instruction from a second core network element, where the fourth sensing instruction instructs the target terminal device to perform a sensing operation; and perform a sensing operation according to the fourth sensing instruction to obtain sensing data related to a target sensing task.

DETAILED DESCRIPTION

In order to make the objectives, technical solutions, and advantages of the disclosure clearer, implementations of the disclosure will be described in further detail below with reference to the accompanying drawings.

The network architecture and service scenario described in embodiments of the disclosure are intended to describe the technical solutions of the embodiments of the disclosure more clearly, and do not constitute limitation on the technical solutions provided in the embodiments of the disclosure. Those of ordinary skill in the art can appreciate that, with evolution of network architectures and emergence of new service scenarios, for similar technical problems, the technical solutions provided in the embodiments of the disclosure are also applicable.

It should be noted that, technical solutions of embodiments of the disclosure may be applied to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a $5^{th}$-generation (5G) communication system, or other communication systems.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), vehicle to vehicle (V2V) communication, or vehicle to everything (V2X) communication, etc. Embodiments of the disclosure can also be applied to these communication systems.

The communication system in embodiments of the disclosure may be applied to a carrier aggregation (CA) scenario, or may be applied to a dual connectivity (DC) scenario, or may be applied to a standalone (SA) network deployment scenario.

The communication system in embodiments of the disclosure is applicable to an unlicensed spectrum, and an unlicensed spectrum may be regarded as a shared spectrum. Alternatively, the communication system in embodiments of the disclosure is applicable to a licensed spectrum, and a licensed spectrum may be regarded as a non-shared spectrum.

The embodiments of the disclosure may be applied to an NTN system, or may be applied to a terrestrial network (TN) system.

Figure 1:
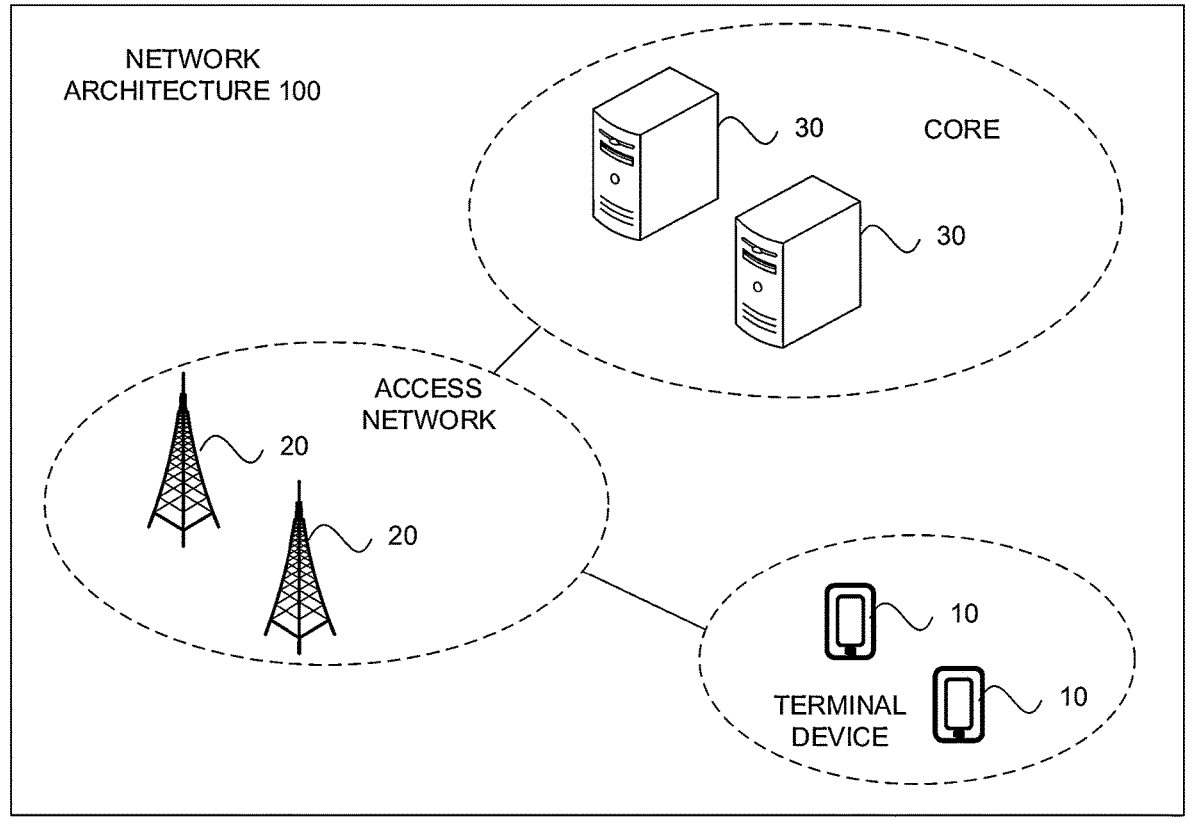
FIG. 1 is a schematic diagram illustrating a network architecture provided in an embodiment of the disclosure.

Referring to FIG. 1, FIG. 1 is a schematic diagram of a network architecture 100 provided in an embodiment of the disclosure. The network architecture 100 may include a terminal device 10, an access-network device 20, and a core network element 30.

The terminal device 10 may refer to a user equipment (UE), an access terminal, a subscriber unit, a subscriber station, a mobile station, a remote station, a remote terminal, a mobile device, a wireless communication device, a user agent, or a user device. Optionally, the terminal device 10 may also be a cellular telephone, a cordless telephone, an session initiation protocol (SIP) telephone, a wireless local loop (WLL) station, a personal digital assistant (PDA), various devices having wireless communication functions such as a handheld device, a computing device, or other processing devices connected to a wireless modem, an in-vehicle device, or a wearable device, a terminal device in a 5G system (5GS) or a terminal device in a future evolved public land mobile network (PLMN), etc., and embodiments of the disclosure are not limited in this regard. For the convenience of illustration, the foregoing devices are collectively referred to as "terminal device". The quantity of terminal devices 10 is generally multiple, and there may be one or more terminal devices 10 distributed in a cell managed by each access-network device 20. In embodiments of the disclosure, the terms "terminal device" and "UE" are usually used interchangeably, but the meaning thereof can be understood by those skilled in the art.

The access-network device 20 is a device deployed in an access network to provide wireless communication functions for the terminal device 10. The access-network device 20 may include various forms of macro base stations, micro base stations, relay stations, access points, etc. The names of a device having functions of the access-network device may be different in systems adopting different radio access technologies, which is, for example, referred to as a gNodeB or a gNB in a 5G NR system. With evolution of communication technology, the name "access-network device" may change. For the convenience of illustration, in embodiments of the disclosure, the foregoing apparatus for providing wireless communication functions for the terminal device 10 is collectively called "access-network device". Optionally, a communication relationship may be established between the terminal device 10 and the core network element 30 via the access-network device 20. Exemplarily, in an LTE system, the access-network device 20 may be an evolved universal terrestrial radio access network (EUTRAN) or one or more eNodeBs in the EUTRAN. In a 5G NR system, the access-network device 20 may be a RAN or one or more gNBs in the RAN.

The core network element 30 is a network element deployed in a core network (Core). Main functions of the core network element 30 are to provide a user connection, manage a user, complete service carrying, and act as a bearer network to provide an interface to an external network. For example, the core network element in a 5G NR system may include network elements such as an access and mobility management function (AMF), a user plane function (UPF), and a session management function (SMF). In addition, the core network element may be regarded as a functional entity, and one or more core network elements may be deployed for a physical device.

In some embodiments, the access-network device 20 and the core network element 30 communicate with each other with some air interface technology, such as an NG interface in a 5G NR system. The access-network device 20 and the terminal device 10 communicate with each other with some air interface technology, such as a UE-UTRAN (Uu) interface.

The "5G NR system" in embodiments of the disclosure may also be referred to as "5G system" or "NR system", but the meaning thereof can be understood by those skilled in the art. The technical solutions described in embodiments of the disclosure may be applied to an LTE system, or may be applied to a 5G NR system, or may be applied to a future evolved system of a 5G NR system, or may be applied to other communication systems such as a narrow band Internet of things (NB-IoT) system, and the disclosure is not limited in this regard.

In embodiments of the disclosure, the access-network device can serve a cell, and the terminal device communicates with the access-network device over a transmission resource (for example, a frequency domain resource, or referred to as spectrum resource) on a carrier used by the cell. The cell may be a cell corresponding to the access-network device (for example, a base station). The cell may belong to a macro base station, or may belong to a base station corresponding to a small cell. The small cell herein may include a metro cell, a micro cell, a pico cell, a femto cell, etc. These small cells are characterized by small coverage and low transmission power and are adapted to provide data transmission service with high-rate.

Figure 2:
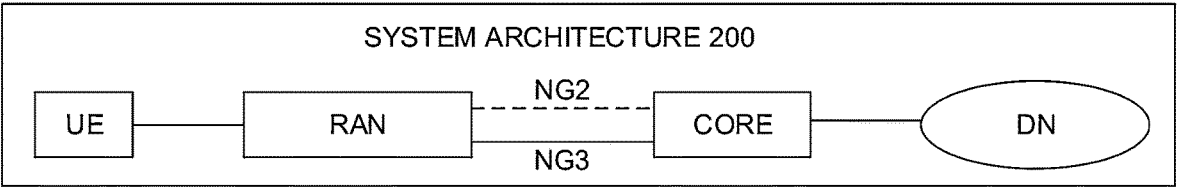
FIG. 2 is an architectural diagram of a $5^{th}$ generation system (5GS) provided in an embodiment of the disclosure.

Referring to FIG. 2, FIG. 2 is a schematic diagram illustrating a system architecture of a 5GS provided in embodiments of the disclosure. As illustrated in FIG. 2, the system architecture 200 may include a UE (i.e. the "terminal device" described above), a (radio) access network ((R)AN), a Core, and a data network (DN). The UE, the (R)AN, and the Core are major components constituting the architecture, and they each may logically be divided into a user plane and a control plane, where the control plane is responsible for mobile network management, and the user plane is responsible for service data transmission. In FIG. 2, NG2 reference point is located between a control plane of the (R)AN and a control plane of the Core, NG3 reference point is located between a user plane of the (R)AN and a user plane of the Core, and NG6 reference point is located between the user plane of the Core and the DN.

UE: an entrance for a mobile user to interact with a network. It can provide basic computing capabilities and storage capabilities, display service windows to the user, and receive user operation input. With a next generation (NG) air interface technology, the UE may establish a signal connection and a data connection with the (R)AN, so that control signals and service data can be transmitted to a mobile network.

(R)AN: similar to a base station in a conventional network, and it is deployed close to the UE to provide network access functions for authorized users in a specific area, and can transmit user data by using transmission tunnels of different qualities according to user levels and service requirements, etc. The (R)AN can manage its own resources, utilize the resources properly, provide access services for the UE according to requirements, and forward the control signals and the user data between the UE and the Core.

Core: responsible for maintaining subscription data of a mobile network, managing network elements of the mobile network, and providing functions such as session management, mobility management, policy management, security authentication, etc. for the UE. When the UE is attached, the Core can provide network access authentication for the UE. When the UE has a service request, the Core can allocate network resources to the UE. When the UE moves, the Core can update network resources for the UE. When the UE is idle, the Core can provide a quick recovery mechanism for the UE. When the UE is detached, the Core can release network resources for the UE. When the UE has service data, the Core can provide a data routing function for the UE, for example, forward uplink data to the DN; or receive downlink data of the UE from the DN and then forward the downlink data to the (R)AN, so as to transmit the downlink data to the UE.

DN: a data network for providing business services for users. Generally, a client is located in the UE, and a server is located in the DN. The DN may be a private network, such as a local area network, or an external network not controlled by operators, such as Internet, or a dedicated network jointly deployed by the operators, for example, for configuring internet protocol (IP) multimedia core network subsystem (IMS) services.

Figure 3:
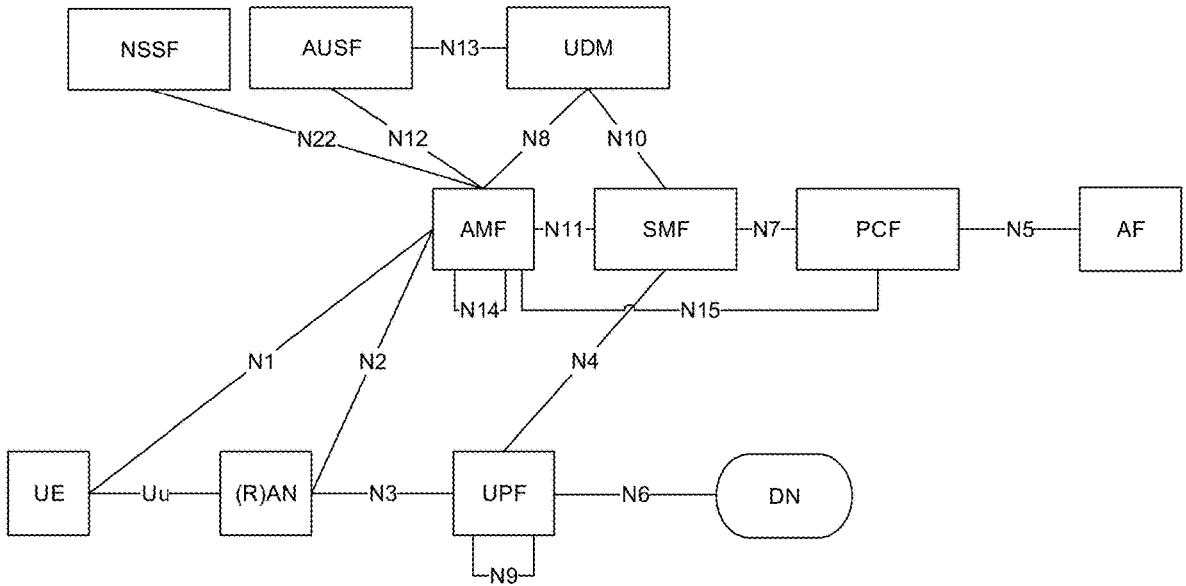
FIG. 3 is an architectural diagram of a 5GS provided in another embodiment of the disclosure.

FIG. 3 illustrates a detailed architecture determined based on the architecture illustrated in FIG. 2. The user plane of the Core includes a UPF. The control plane of the Core includes an authentication server function (AUSF), an AMF, an SMF, a network slice selection function (NSSF), a network exposure function (NEF), a network repository function (NRF), a unified data management (UDM), a policy control function (PCF), and an application function (AF).

In the architecture illustrated in FIG. 3, the UE establishes an access stratum (AS) connection with the (R)AN over a Uu interface in order for AS message interaction and wireless data transmission. The UE establishes a non-access stratum (NAS) connection with the AMF via N1 interface in order for NAS message interaction. The AMF is a mobility management function in the Core. The SMF is a session management function in the Core. In addition to mobility management of the UE, the AMF is also responsible for forwarding a session management related message between the UE and the SMF. The PCF is a policy management function in the Core, and is responsible for formulating related policies regarding mobility management, session management, charging, etc. of the UE. The UPF is a user plane function in the Core, which performs data transmission with an external DN via N6 interface, and performs data transmission with the (R)AN via N3 interface.

It is to be noted that, the names of interfaces between various network elements in FIG. 2 and FIG. 3 are merely an example, and the interfaces may also be in other names in actual implementations, and embodiments of the disclosure are not limited in this regard. The names of the network elements (such as SMF, AF, UPF, etc.) in FIG. 2 and FIG. 3 are also merely an example, and do not constitute limitation on the functions of the network elements. In a 5GS and other future networks, the foregoing network elements may also be in other names, and embodiments of the disclosure are not limited in this regard. For example, in a $6^{th}$ generation (6G) network, some or all of the foregoing network elements may use the terms in 5G, or may use other names, etc., which is collectively explained herein and will not be described again below. In addition, it is to be understood that, the names of messages (or signaling) transmitted between the foregoing network elements are merely an example, and do not constitute any limitation on the functions of the messages.

A current $3^{rd}$ generation partnership project (3GPP) network only has communication capability. If a future cellular network not only supports communication capability but also supports sensing capability, in case an application function sends a sensing request to a Core of the 3GPP network, the current Core does not have capability of selecting correctly an access-network device or a terminal device and triggering sensing-related radio measurement of the access-network device or the terminal device. Therefore, measurement of sensing data and generation of a sensing result cannot be enabled according to the request of the AF.

Figure 4:
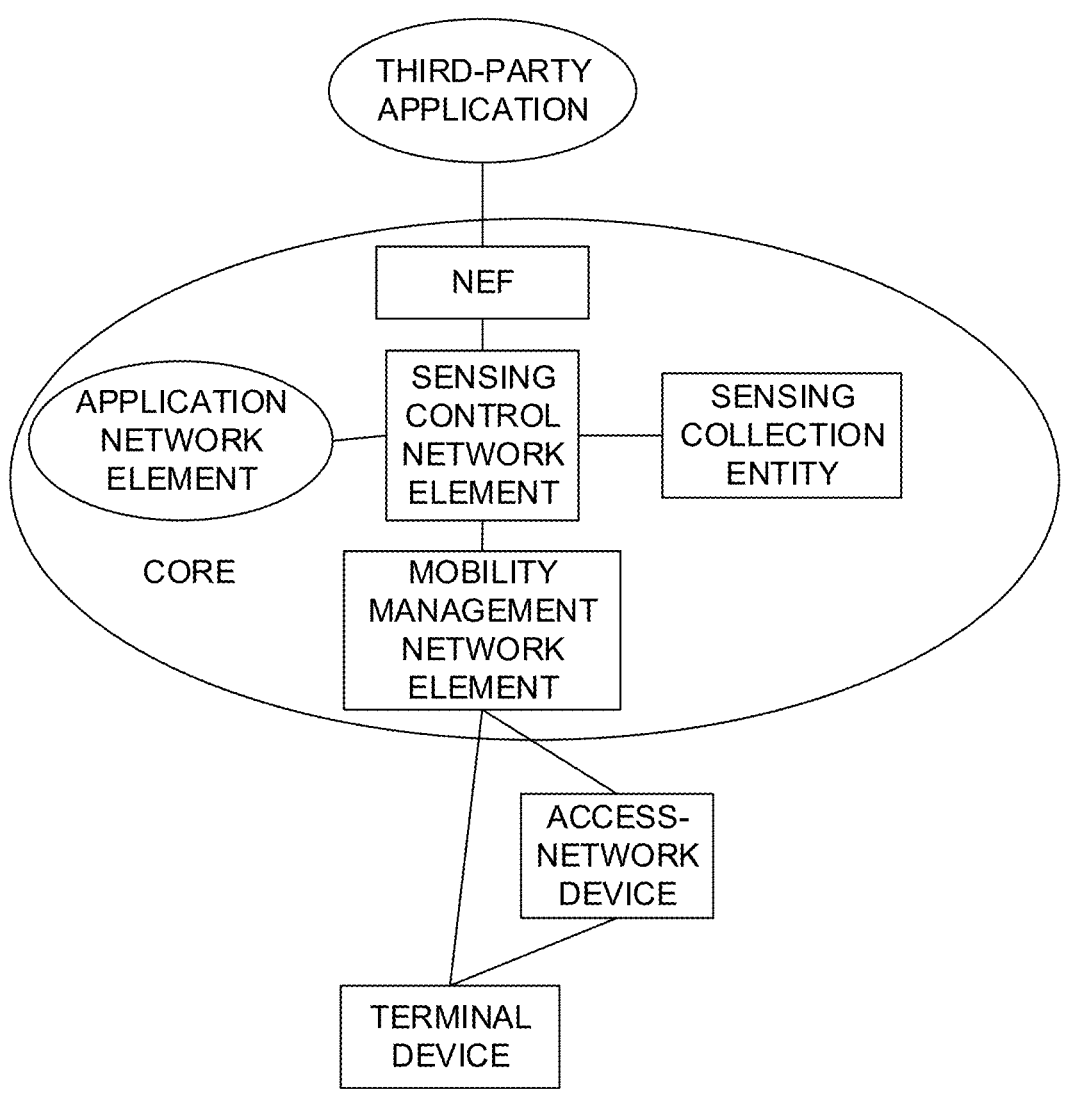
FIG. 4 is a schematic diagram of a system for sensing control provided in an embodiment of the disclosure.

As illustrated in FIG. 4, in an exemplary embodiment of the disclosure, a sensing control network element and a sensing collection entity are added to a Core. The sensing control network element is responsible for control plane message interaction with an AF and control plane message interaction with an internal network element of an operator network. The AF may be an internal application network element of the operator network and interact directly with the sensing control network element, or may be a third-party application external to the operator network and interact with the sensing control network element via an NEF. The sensing collection entity is responsible for collecting sensing data, which includes sensing-related measurement data (such as radio signal measurement data) and a sensing result obtained after calculation or analysis. The sensing collection entity itself may also calculate or analyze the sensing-related measurement data collected, so as to generate a sensing result.

It should be noted that, the sensing control network element may be new network element in the Core, or may be an existing network element with extended function in the Core, that is, the function of the existing network element is extended such that the existing network element has the functions implemented by the sensing control network element described above. Similarly, the sensing collection entity may be a new network element in the Core, or may be an existing network element with extended function in the Core, that is, the function of the existing network element is extended such that the existing network element has the functions implemented by the sensing collection entity described above. In addition, the sensing control network element may also be referred to as "sensing control function" or "sensing control entity", or other names, and the disclosure is not limited in this regard. The sensing collection entity may also be referred to as "sensing collection network element", "sensing collection function", or other names, and the disclosure is not limited in this regard.

In the following embodiments, a first core network element is a network element responsible for control plane message interaction with an AF and control plane message interaction with an internal network element of an operator network. For example, the first core network element may be the sensing control network element in the architecture illustrated in FIG. 4. A second core network element may be a mobility management network element in the system architecture illustrated in FIG. 4, such as an AMF in a 5GS, and is responsible for message forwarding between a terminal device/access-network device and other core network elements in addition to mobility management of the terminal device. A third core network element is a network element responsible for collecting sensing data. For example, the third core network element may be the sensing collection entity in the architecture illustrated in FIG. 4.

Figure 5:
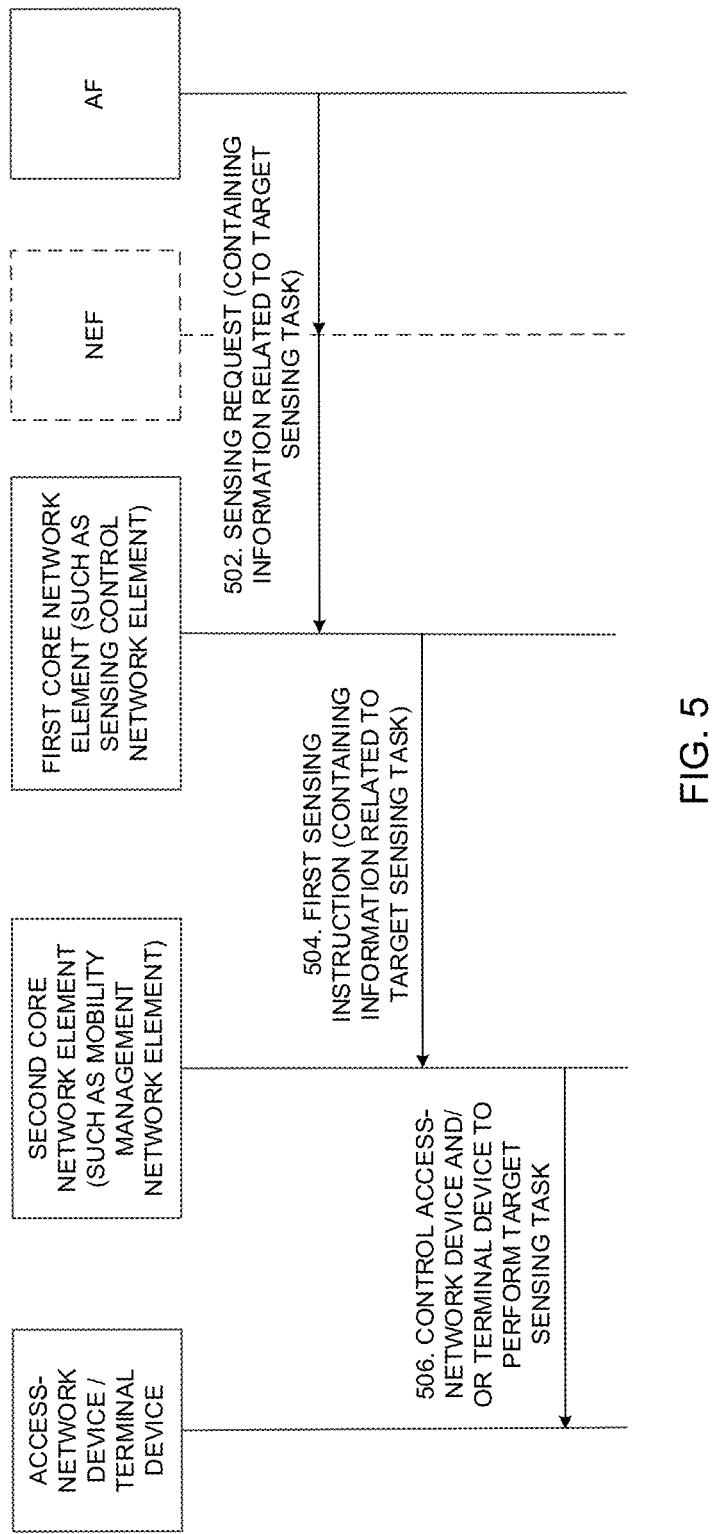
FIG. 5 is a flowchart of a method for sensing control provided in an embodiment of the disclosure.

Referring to FIG. 5, FIG. 5 is a flowchart of a method for sensing control provided in an embodiment of the disclosure. The method may be applied to the system architectures illustrated in FIG. 1 to FIG. 4. The method may include at least one of the following steps (502~506).

Step 502, a first core network element receives a sensing request from an AF, where the sensing request is used for requesting obtaining a sensing result corresponding to a target sensing task.

If the AF is an internal device of an operator network, the AF sends the sensing request directly to the first core network element. The AF may determine, according to configuration information stored, the first core network element for receiving the sensing request. The AF may also query, from other network elements, the first core network element for receiving the sensing request.

If the AF is an external device of the operator network, the AF sends the sensing request to an NEF, and then the NEF sends the sensing request to the first core network element. The NEF may determine, according to the configuration information stored, the first core network element for receiving the sensing request. The NEF may also query, from other network elements, the first core network element for receiving the sensing request.

Exemplarily, in a 5GS, the other network elements may be an NRF. When querying, from the other network elements, the first core network element for receiving the sensing request, the AF or the NEF may provide information related to the target sensing task to the other network elements, so as to obtain information of the first core network element. Optionally, the information of the first core network element includes at least one of: a device identity (ID) of the first core network element, an internet protocol (IP) address of the first core network element, or domain name information of the first core network element, where the domain name information may be a fully qualified domain name (FQDN), etc.

Optionally, the sensing request contains the information related to the target sensing task, such as a sensing type corresponding to the target sensing task. The sensing type includes, but is not limited to, user action or gesture recognition, breathing monitoring, terminal moving speed measurement, environment imaging, and weather monitoring. The sensing type may be categorized according to actual needs, and the disclosure is not limited in this regard.

Step 504, the first core network element sends a first sensing instruction to one or more second core network elements according to the sensing request, where the first sensing instruction instructs the second core network element to control an access-network device and/or a terminal device to perform the target sensing task.

Optionally, the first sensing instruction contains the information related to the target sensing task, for example, information such as the sensing type corresponding to the target sensing task.

Step 506, the second core network element controls, according to the first sensing instruction, the access-network device and/or the terminal device to perform the target sensing task.

For example, the second core network element sends a sensing instruction to the access-network device and/or the terminal device, so as to trigger the access-network device and/or the terminal device to obtain sensing data related to the target sensing task. Optionally, the sensing data includes at least one of: sensing measurement data or a sensing result, where the sensing measurement data is data used for determining the sensing result. For example, the sensing measurement data may be a measurement value, such as a signal strength and a transmission distance, of a radio electromagnetic wave signal, and the disclosure is not limited in this regard.

Optionally, the access-network device and/or the terminal device may report the sensing data to a third core network element. The third core network element generates, based on the collected sensing data related to the target sensing task, a final sensing result corresponding to the target sensing task, and then provides the final sensing result to the AF.

Optionally, the access-network device and/or the terminal device may report the sensing measurement data directly to the third core network element, and the third core network element calculates or analyzes the sensing measurement data to obtain a corresponding sensing result. The access-network device and/or the terminal device may also calculate or analyze the sensing measurement data to obtain a corresponding sensing result, and then report the sensing result to the third core network element. Taking weather sensing as an example, a measurement value of a radio electromagnetic wave signal may differ under different weather conditions such as sunny, rainy, etc. Therefore, by calculating or analyzing a measurement value of a radio electromagnetic wave signal of a certain area, it is possible to know the weather condition of the area.

Optionally, the third core network element may generate a final sensing result corresponding to the target sensing task according to the collected sensing data related to the target sensing task. For example, the third core network element may generate the final sensing result corresponding to the target sensing task by calculating or analyzing the collected sensing measurement data. For another example, the third core network element may generate the final sensing result corresponding to the target sensing task based on sensing data collected from multiple parties (for example, multiple access-network devices and/or terminal devices).

In embodiments of the disclosure, after receiving the sensing request sent by the AF, a core network element can select correctly an access-network device and/or a terminal device, and trigger the access-network device and/or the terminal device to execute a sensing task, which is possible to ensure that the sensing request of the AF can be correctly executed and responded, thereby improving sensing capability of a cellular network.

Figure 6:
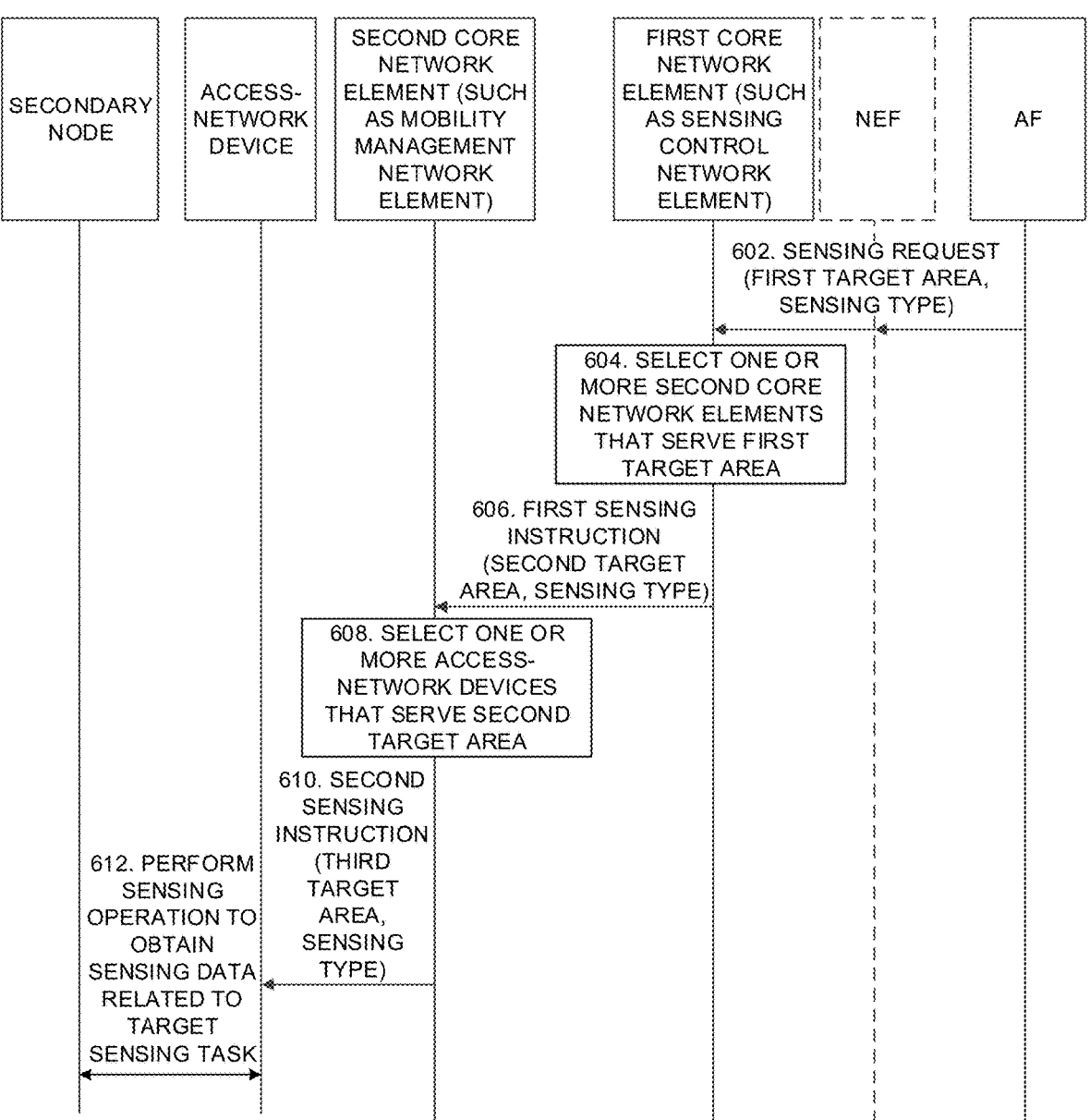
FIG. 6 is a flowchart of a method for sensing control provided in another embodiment of the disclosure.

Referring to FIG. 6, FIG. 6 is a flowchart of a method for sensing control provided in another embodiment of the disclosure. The method may be applied to the system architectures illustrated in FIG. 1 to FIG. 4. The method may include at least one of the following steps (602~612).

Step 602, a first core network element receives a sensing request from an AF, where the sensing request is used for requesting obtaining a sensing result corresponding to a target sensing task, the sensing request contains first area information, and the first area information indicates a first target area corresponding to the target sensing task.

In the embodiments, the sensing request contains the first area information, and the first area information indicates the first target area corresponding to the target sensing task. The target sensing task is exemplarily weather sensing, and the first target area may be a geographical location, such as a city, a village, etc.

Optionally, in addition to the first area information, the sensing request further contains a sensing type corresponding to the target sensing task. For example, the sensing type includes, but is not limited to, user action or gesture recognition, breathing monitoring, terminal moving speed measurement, environment imaging, weather monitoring, and the like.

Step 604, the first core network element selects one or more second core network elements that serve the first target area.

For example, the first core network element selects, from all second core network elements deployed in a Core, the second core network element(s) that serves the first target area, where the number of the selected second core network elements may be one or multiple.

Step 606, the first core network element sends a first sensing instruction to the selected second core network element(s).

Optionally, the first sensing instruction contains second area information, where the second area information indicates a second target area that needs to be sensed by the second core network element.

Optionally, the second target area is the first target area, or the second target area is a sub-area (or referred to as a "subset") of the first target area.

For example, if the first core network element selects one second core network element that serves the first target area, the second target area indicated by the second area information contained in the first sensing instruction sent to the selected second core network element by the first core network element is the first target area.

For another example, if the first core network element selects multiple second core network elements that serve the first target area, and different second core network elements can serve different sub-areas of the first target area respectively, then the first core network element may send the first sensing instructions to the selected second core network elements respectively, and the second target area indicated by the second area information contained in the first sensing instruction sent to one of the second core network elements may be a sub-area of the first target area.

Exemplarily, the first core network element selects two second core network elements that serve the first target area, which are denoted as network element A and network element B. Network element A serves sub-area 1 in the first target area, and network element B serves sub-area 2 in the first target area, where sub-area 1 and sub-area 2 each are a part of the first target area, and sub-area 1 and sub-area 2 can constitute the whole first target area. The first core network element sends the first sensing instruction to network element A, where the second area information in the first sensing instruction indicates sub-area 1 that needs to be sensed by network element A. In addition, the first core network element further sends the first sensing instruction to network element B, where the second area information in the first sensing instruction indicates sub-area 2 that needs to be sensed by network element B.

Optionally, the first sensing instruction further contains the sensing type corresponding to the target sensing task. In case the first core network element selects multiple second core network elements that serve the first target area, if the sensing type corresponding to the target sensing task includes only one type, the sensing types contained in the first sensing instructions sent to the selected second core network elements by the first core network element may be the same sensing type; if the sensing type corresponding to the target sensing task includes multiple types, the sensing types contained in the first sensing instructions sent to the selected second core network elements by the first core network element may be the same or different, for example, different second core network elements are responsible for processing different sensing types.

Step 608, the second core network element selects one or more access-network devices that serve the second target area.

According to different areas served by access-network devices and different sensing capabilities of access-network devices, the second core network element selects one or more access-network devices to perform a sensing operation.

Optionally, the second core network element selects one or more access-network devices that serve the second target area and support the sensing type corresponding to the target sensing task. For example, the access-network device(s) that serves the second target area includes base station A, base station B, and base station C. Assuming that base station A and base station C support the sensing type corresponding to the target sensing task but base station B does not support the sensing type corresponding to the target sensing task, the second core network element may select base station A and/or base station C to perform the target sensing task.

Step 610, the second core network element sends a second sensing instruction to the selected access-network device(s), where the second sensing instruction instructs the access-network device to perform a sensing operation.

Optionally, the second sensing instruction contains third area information, where the third area information indicates a third target area that needs to be sensed by the access-network device.

Optionally, the third target area is the second target area, or the third target area is a sub-area (or referred to as a "subset") of the second target area.

For example, if the second core network element selects one access-network device that serves the second target area, the third target area indicated by the third area information contained in the second sensing instruction sent to the selected access-network device by the second core network element is the second target area.

For another example, if the second core network element selects multiple access-network devices that serve the second target area, and different access-network devices can serve different sub-areas of the second target area respectively, then the second core network element can send the second sensing instructions to the selected access-network devices respectively, and the third target area indicated by the third area information contained in the second sensing instruction sent to one of the access-network devices may be a sub-area of the second target area.

Exemplarily, the second core network element selects two access-network devices that serve the second target area, which are denoted as base station A and base station B. Base station A serves sub-area A in the second target area, and base station B serves sub-area B in the second target area, where sub-area A and sub-area B each are a part of the second target area, and sub-area A and sub-area B can constitute the whole second target area. The second core network element sends the second sensing instruction to base station A, where the third area information in the second sensing instruction indicates sub-area A that needs to be sensed by base station A. In addition, the second core network element further sends the second sensing instruction to base station B, where the third area information in the second sensing instruction indicates sub-area B that needs to be sensed by base station B.

Optionally, the second sensing instruction further contains the sensing type corresponding to the target sensing task. In case the second core network element selects multiple access-network devices that serve the second target area, if the sensing type corresponding to the target sensing task includes only one type, the sensing types contained in the second sensing instructions sent to the selected access-network devices by the second core network element may be the same sensing type; if the sensing type corresponding to the target sensing task includes multiple types, the sensing types contained in the second sensing instructions sent to the selected access-network devices by the second core network element may be the same or different, for example, different access-network devices are responsible for processing different sensing types.

Step 612, the access-network device performs a sensing operation according to the second sensing instruction to obtain sensing data related to the target sensing task.

Optionally, if the second sensing instruction contains the third area information, the access-network device determines sensing data for the third target area according to radio signal measurement of the access-network device itself and/or radio signal measurement of a secondary node. Optionally, the sensing data includes at least one of: sensing measurement data or a sensing result, where the sensing measurement data is data used for determining the sensing result. For example, the sensing measurement data may be a measurement value, such as a signal strength and a transmission distance, of a radio electromagnetic wave signal, which is not limited in the disclosure.

Optionally, the access-network device selects, according to secondary node selection reference information, a secondary node for obtaining the sensing data for the third target area. The secondary node may be other access-network devices (for example, other access-network devices adjacent to the access-network device), or may be a terminal device (for example, a terminal device connected to the access-network device). The secondary node selection reference information is information for determining the secondary node. For example, the secondary node selection reference information includes at least one of: sensing capabilities of other access-network devices adjacent to the access-network device, a sensing capability of a terminal device connected to the access-network device, or a sensing permission of the terminal device connected to the access-network device. The access-network device may perform a sensing operation by itself to obtain the sensing data related to the target sensing task, or may perform a sensing operation via the secondary node to obtain the sensing data related to the target sensing task.

Optionally, the access-network device may report the sensing data related to the target sensing task to a third core network element. The third core network element generates, based on the collected sensing data related to the target sensing task, a final sensing result corresponding to the target sensing task, and provides the final sensing result to the AF.

In the embodiments, the access-network device is controlled to perform an area-level sensing operation, such that the access-network device generates area-level sensing data.

Figure 7:
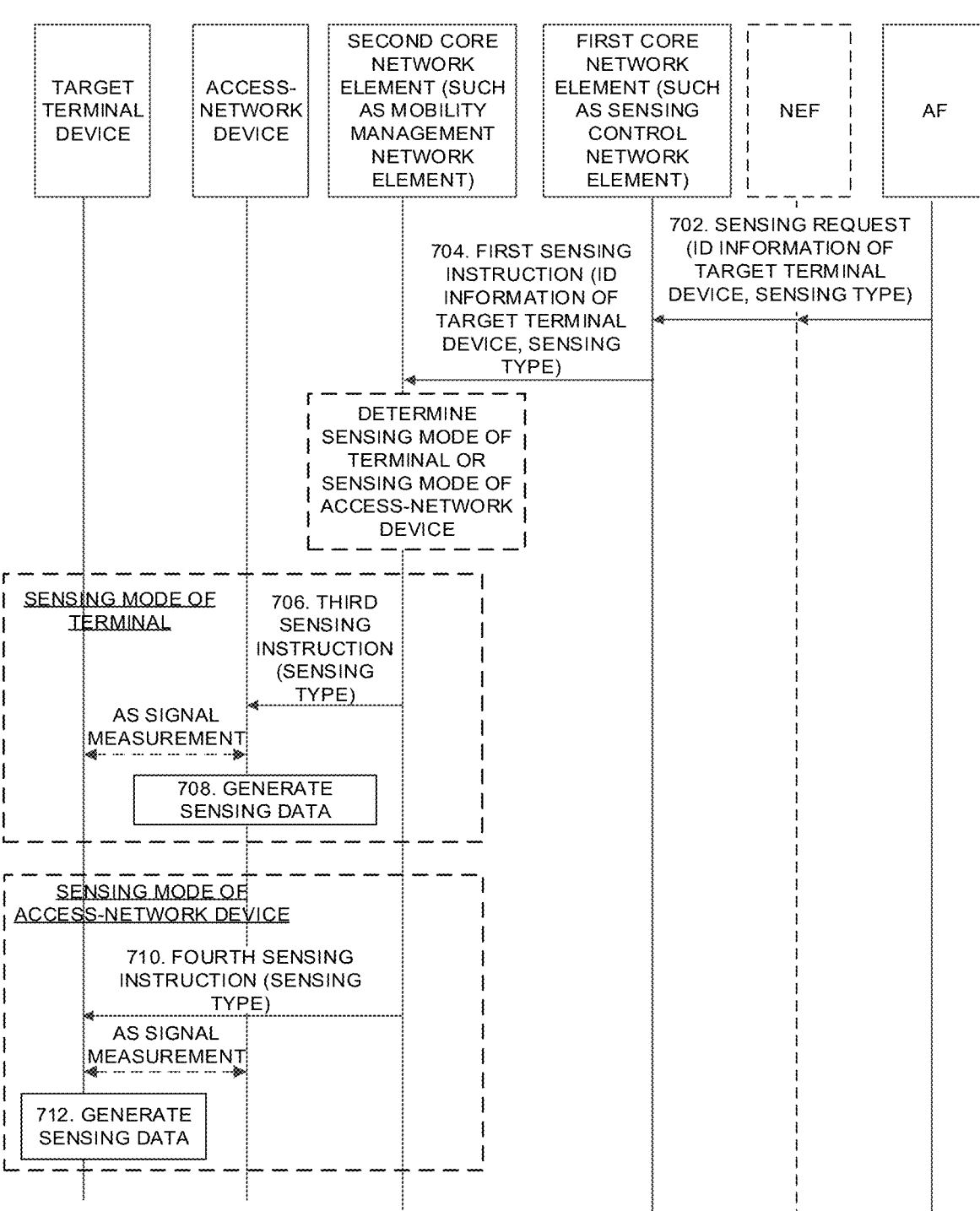
FIG. 7 is a flowchart of a method for sensing control provided in another embodiment of the disclosure.

Referring to FIG. 7, FIG. 7 is a flowchart of a method for sensing control provided in another embodiment of the disclosure. The method may be applied to the system architectures illustrated in FIG. 1 to FIG. 4. The method may include at least one of the following steps (702~712).

Step 702, a first core network element receives a sensing request from an AF, where the sensing request is used for requesting obtaining a sensing result corresponding to a target sensing task, and the sensing request contains ID information of a target terminal device.

In the embodiments, the sensing request contains the ID information of the target terminal device, so as to implement a terminal-level sensing operation. The ID information of the target terminal device is used for uniquely identifying the target terminal device, and different terminal devices may have different ID information, so that different terminal devices can be differentiated by the ID information. Optionally, the number (that is, quantity) of the target terminal devices contained in the sensing request may be one or multiple.

Optionally, in addition to the ID information of the target terminal device, the sensing request further contains a sensing type corresponding to the target sensing task. For example, the sensing type includes, but is not limited to, user action or gesture recognition, breathing monitoring, terminal moving speed measurement, environment imaging, weather monitoring, and the like.

Step 704, the first core network element sends a first sensing instruction to a second core network element(s) that serves the target terminal device.

For example, the first core network element selects, from all second core network elements deployed in a Core, the second core network element that serves target terminal device, where the number of the selected second core network elements may be one or multiple. For example, if there is one target terminal device, there is usually one second core network element that serves the target terminal device; if there are multiple target terminal devices, there may be one second core network element that serves the target terminal devices (that is, the multiple target terminal devices are served by the same second core network element), or there may be multiple second core network elements, for example, some of the target terminal devices are served by second core network element A, and the rest of the target terminal devices are served by second core network element B.

Optionally, the first sensing instruction contains the ID information of the target terminal device. The target terminal device indicated by the first sensing instruction may be all target terminal devices indicated by the sensing request, or may be some of the target terminal devices indicated by the sensing request. For example, there are multiple target terminal devices, and among these target terminal devices, some of the target terminal devices are served by second core network element A and the rest of the target terminal devices are served by second core network element B. Then, the first sensing instruction sent to second core network element A by the first core network element contains ID information of the target terminal devices served by second core network element A, and the first sensing instruction sent to second core network element B by the first core network element contains ID information of the target terminal devices served by second core network element B.

Optionally, the first sensing instruction further contains the sensing type corresponding to the target sensing task.

Optionally, after receiving the first sensing instruction, the second core network element determines to enable the access-network device to perform the target sensing task or enable the terminal device to perform the target sensing task. For example, the second core network element determines, according to a sensing capability of the target terminal device and/or a sensing capability of the access-network device that serves the target terminal device, whether to directly enable the target terminal device to perform sensing or to enable the access-network device to perform sensing on the target terminal device.

In some other embodiments, determination to enable the access-network device to perform the target sensing task or to enable the terminal device to perform the target sensing task may also be implemented by the first core network element. In this case, the first sensing instruction sent to the second core network element by the first core network element may further contain sensing mode indication information, where the sensing mode indication information indicates to enable the access-network device to perform the target sensing task or to enable the terminal device to perform the target sensing task. The second core network element determines, according to the sensing mode indication information contained in the first sensing instruction, to enable the access-network device to perform the target sensing task or to enable the terminal device to perform the target sensing task. For example, if the sensing mode indication information indicates to enable the access-network device to perform the target sensing task, the second core network element enables the access-network device to perform the target sensing task, and performs step 706 below; if the sensing mode indication information indicates to enable the terminal device to perform the target sensing task, the second core network element enables the terminal device to perform the target sensing task, and performs step 710 below.

Steps 706~708 below relate to the case of determining to enable the access-network device to perform the target sensing task.

Step 706, for the case of determining to enable the access-network device to perform the target sensing task, the second core network element sends a third sensing instruction to the access-network device that serves the target terminal device, where the third sensing instruction indicates that the access-network device is to perform a sensing operation on the target terminal device.

In some embodiments, the third sensing instruction contains the ID information of the target terminal device. The second core network element indicates the target terminal device to the access-network device by carrying the ID information of the target terminal device in the third sensing instruction.

In other embodiments, the third sensing instruction may not contain the ID information of the target terminal device. The second core network element indicates the target terminal device to the access-network device through a terminal-level signaling interaction connection maintained between the second core network element and the access-network device.

Optionally, the third sensing instruction contains the sensing type corresponding to the target sensing task, so that the access-network device knows which type of sensing task is to be performed.

Step 708, the access-network device performs a sensing operation according to the third sensing instruction to obtain sensing data related to the target sensing task.

Optionally, the access-network device determines sensing data for the target terminal device according to radio signal measurement between the access-network device itself and the target terminal device. For example, if the third sensing instruction contains the sensing type corresponding to the target sensing task, the access-network device determines, according to radio signal measurement between the access-network device itself and the target terminal device, the sensing data for the target terminal device that corresponds to the sensing type.

Optionally, the sensing data includes at least one of: sensing measurement data or a sensing result, where the sensing measurement data is data used for determining the sensing result. For example, the sensing measurement data may be a measurement value, such as a signal strength and a transmission distance, of a radio electromagnetic wave signal, and the disclosure is not limited in this regard.

Optionally, the access-network device may report the sensing data related to the target sensing task to a third core network element. The third core network element generates, based on the collected sensing data related to the target sensing task, a final sensing result corresponding to the target sensing task, and provides the final sensing result to the AF.

Steps 710~712 below relate to the case of determining to enable the terminal device to perform the target sensing task.

Step 710, for the case of determining to enable the terminal device to perform the target sensing task, the second core network element sends a fourth sensing instruction to the target terminal device, where the fourth sensing instruction indicates that the target terminal device is to perform a sensing operation.

Optionally, the fourth sensing instruction is sent through a NAS message, so as to send the fourth sensing instruction directly to the terminal device from the second core network element.

Optionally, the fourth sensing instruction contains the sensing type corresponding to the target sensing task, so that the terminal device knows which type of sensing task is to be performed.

Step 712, the target terminal device performs a sensing operation according to the fourth sensing instruction to obtain sensing data related to the target sensing task.

Optionally, the target terminal device enables radio signal measurement according to the fourth sensing instruction to obtain the sensing data related to the target sensing task. For example, if the fourth sensing instruction contains the sensing type corresponding to the target sensing task, the terminal device enables radio signal measurement to obtain sensing data corresponding to the sensing type.

Optionally, the sensing data includes at least one of: sensing measurement data or a sensing result, where the sensing measurement data is data used for determining the sensing result. For example, the sensing measurement data may be a measurement value, such as a signal strength and a transmission distance, of a radio electromagnetic wave signal, and the disclosure is not limited in this regard.

Optionally, the terminal device may report the sensing data related to the target sensing task to a third core network element. The third core network element generates, based on the collected sensing data related to the target sensing task, a final sensing result corresponding to the target sensing task, and provides the final sensing result to the AF.

In the embodiments, the access-network device or the terminal device is controlled to perform a terminal-level sensing operation, so that the access-network device or the terminal device generates terminal-level sensing data.

In the embodiments, after receiving the sensing request sent by the AF, a core network element can select correctly an access-network device and/or a terminal device, and trigger the access-network device and/or the terminal device to execute a sensing task, which is possible to ensure that the sensing request of the AF can be correctly executed and responded, thereby improving sensing capability of the cellular network.

It should be noted that, in the foregoing embodiments, for the convenience of understanding, the technical solutions of the disclosure are described only from the perspective of interaction between multiple devices. The foregoing steps performed by the first core network element (such as a sensing control network element) may be implemented separately as a method for sensing control at a first core network element side. The foregoing steps performed by the second core network element (such as a mobility management network element) may be implemented separately as a method for sensing control at a second core network element side. The foregoing steps performed by the access-network device may be implemented separately as a method for sensing control at an access-network device the side. The foregoing steps performed by the terminal device may be implemented separately as a method for sensing control at a terminal device side.

The following will describe apparatus embodiments of the disclosure, which may be used to implement the method embodiments of the disclosure. For details not disclosed in the apparatus embodiments of the disclosure, reference can be made to the method embodiments of the disclosure.

Figure 8:
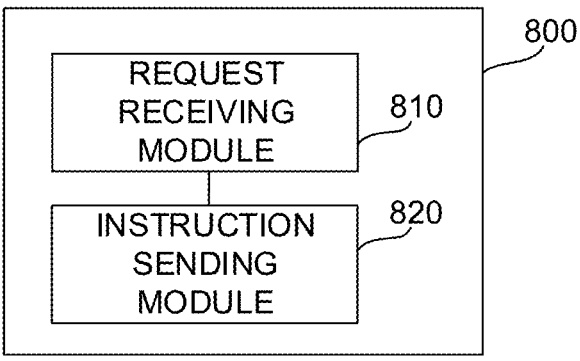
FIG. 8 is a block diagram of an apparatus for sensing control provided in an embodiment of the disclosure.

Referring to FIG. 8, FIG. 8 is a block diagram of an apparatus for sensing control provided in an embodiment of the disclosure. The apparatus has a function of implementing method examples at a first core network element (such as a sensing control network element) side. The function may be implemented by hardware or may be implemented by hardware executing corresponding software. The apparatus may be the first core network element described above, or may be disposed in the first core network element. As illustrated in FIG. 8, the apparatus 800 may include a request receiving module 810 and an instruction sending module 820. The request receiving module 810 is configured to receive a sensing request from an AF, where the sensing request is used for requesting obtaining a sensing result corresponding to a target sensing task. The instruction sending module 820 is configured to send a first sensing instruction to one or more second core network elements according to the sensing request, where the first sensing instruction instructs the second core network element to control an access-network device and/or a terminal device to perform the target sensing task.

In some embodiments, the sensing request contains first area information, and the first area information indicates a first target area corresponding to the target sensing task.

In some embodiments, the instruction sending module 820 is configured to select one or more second core network elements that serve the first target area, and send the first sensing instruction to the selected second core network element.

In some embodiments, the first sensing instruction contains second area information, and the second area information indicates a second target area that needs to be sensed by the second core network element.

In some embodiments, the second target area is the first target area, or the second target area is a sub-area of the first target area.

In some embodiments, the sensing request contains ID information of a target terminal device.

In some embodiments, the instruction sending module 820 is configured to send the first sensing instruction to the second core network element that serves the target terminal device.

In some embodiments, the first sensing instruction contains the ID information of the target terminal device.

In some embodiments, the sensing request contains a sensing type corresponding to the target sensing task.

In some embodiments, the first sensing instruction contains the sensing type corresponding to the target sensing task.

In some embodiments, if the AF is an internal device of an operator network, the sensing request is sent by the AF directly to the first core network element. Alternatively, if the AF is an external device of an operator network, the sensing request is sent by the AF to an NEF and then sent to the first core network element by the NEF.

In some embodiments, the first core network element for receiving the sensing request is determined by the AF or the NEF according to configuration information stored. Alternatively, the first core network element for receiving the sensing request is queried by the AF or the NEF from other network elements.

Figure 9:
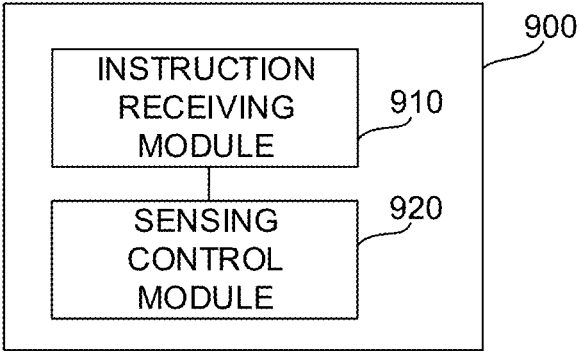
FIG. 9 is a block diagram of an apparatus for sensing control provided in another embodiment of the disclosure.

Referring to FIG. 9, FIG. 9 is a block diagram of an apparatus for sensing control provided in another embodiment of the disclosure. The apparatus has a function of implementing the method examples at a second core network element (such as a mobility management network element) side. The function may be implemented by hardware, or may be implemented by hardware executing corresponding software. The apparatus may be the second core network element described above, or may be disposed in the second core network element. As illustrated in FIG. 9, the apparatus 900 may include an instruction receiving module 910 and a sensing control module 920. The instruction receiving module 910 is configured to receive a first sensing instruction from a first core network element, where the first sensing instruction instructs the second core network element to control an access-network device and/or a terminal device to perform a target sensing task. The sensing control module 920 is configured to control, according to the first sensing instruction, the access-network device and/or the terminal device to perform the target sensing task.

In some embodiments, the first sensing instruction contains second area information, and the second area information indicates a second target area that needs to be sensed by the second core network element.

In some embodiments, the sensing control module 920 is configured to select one or more access-network devices that serve the second target area, and send a second sensing instruction to the selected access-network device, where the second sensing instruction instructs the access-network device to perform a sensing operation.

In some embodiments, the second sensing instruction contains third area information, and the third area information indicates a third target area that needs to be sensed by the access-network device.

In some embodiments, the third target area is the second target area, or the third target area is a sub-area of the second target area.

In some embodiments, the second sensing instruction contains a sensing type corresponding to the target sensing task.

In some embodiments, the sensing control module 920 is configured to select one or more access-network devices that serve the second target area and support the sensing type.

In some embodiments, the first sensing instruction contains ID information of a target terminal device.

In some embodiments, the sensing control module 920 is configured to send a third sensing instruction to an access-network device that serves the target terminal device, in case of determining to enable the access-network device to perform the target sensing task, where the third sensing instruction instructs the access-network device to perform a sensing operation on the target terminal device.

In some embodiments, the second core network element indicates the target terminal device to the access-network device by carrying the ID information of the target terminal device in the third sensing instruction. Alternatively, the second core network element indicates the target terminal device to the access-network device through a terminal-level signaling interaction connection maintained between the second core network element and the access-network device.

In some embodiments, the third sensing instruction contains the sensing type corresponding to the target sensing task.

In some embodiments, the sensing control module 920 is configured to send a fourth sensing instruction to the target terminal device in case of determining to enable the terminal device to perform the target sensing task, where the fourth sensing instruction instructs the target terminal device to perform a sensing operation.

In some embodiments, the fourth sensing instruction is sent through an NAS message.

In some embodiments, the fourth sensing instruction contains the sensing type corresponding to the target sensing task.

Figure 10:
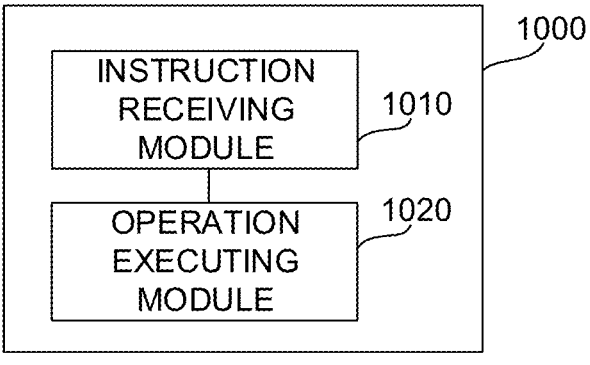
FIG. 10 is a block diagram of an apparatus for sensing control provided in another embodiment of the disclosure.

Referring to FIG. 10, FIG. 10 is a block diagram of an apparatus for sensing control provided in another embodiment of the disclosure. The apparatus has a function of implementing the method examples at an access-network device side. The function may be implemented by hardware, or may be implemented by hardware executing corresponding software. The apparatus may be the access-network device described above, or may be disposed in the access-network device. As illustrated in FIG. 10, the apparatus 1000 may include an instruction receiving module 1010 and an operation executing module 1020. The instruction receiving module 1010 is configured to receive a target sensing instruction from a second core network element, where the target sensing instruction instructs an access-network device to perform a sensing operation related to a target sensing task. The operation executing module 1020 is configured to perform the sensing operation according to the target sensing instruction to obtain sensing data related to the target sensing task.

In some embodiments, the target sensing instruction contains third area information, and the third area information indicates a third target area that needs to be sensed by the access-network device.

In some embodiments, the operation executing module 1020 is configured to determine sensing data for the third target area according to radio signal measurement of the access-network device itself and/or radio signal measurement of a secondary node.

In some embodiments, the operation executing module 1020 is further configured to select, according to secondary node selection reference information, a secondary node for obtaining the sensing data for the third target area, where the secondary node selection reference information includes at least one of: sensing capabilities of other access-network devices adjacent to the access-network device, a sensing capability of a terminal device connected to the access-network device, or a sensing permission of a terminal device connected to the access-network device.

In some embodiments, the target sensing instruction instructs the access-network device to perform a sensing operation on a target terminal device.

In some embodiments, the operation executing module 1020 is configured to determine sensing data for the target terminal device according to radio signal measurement between the access-network device itself and the target terminal device.

In some embodiments, the target sensing instruction contains a sensing type corresponding to the target sense task.

In some embodiments, the sensing data includes at least one of: sensing measurement data or a sensing result, where the sensing measurement data is data for determining the sensing result.

Figure 11:
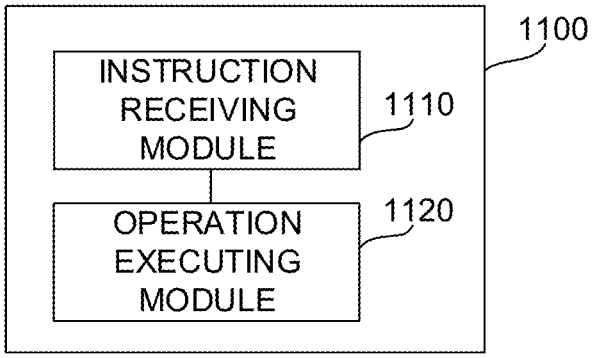
FIG. 11 is a block diagram of an apparatus for sensing control provided in another embodiment of the disclosure.

Referring to FIG. 11, FIG. 11 is a block diagram of an apparatus for sensing control provided in another embodiment of the disclosure. The apparatus has a function of implementing the method examples at a target terminal device side. The function may be implemented by hardware or by hardware executing corresponding software. The apparatus may be the target terminal device described above, or may be disposed in the target terminal device. As illustrated in FIG. 11, the apparatus 1100 may include an instruction receiving module 1110 and an operation executing module 1120. The instruction receiving module 1110 is configured to receive a fourth sensing instruction from a second core network element, where the fourth sensing instruction instructs a target terminal device to perform a sensing operation. The operation executing module 1120 is configured to perform the sensing operation according to the fourth sensing instruction to obtain sensing data related to a target sensing task.

In some embodiments, the fourth sensing instruction is sent through an NAS message.

In some embodiments, the fourth sensing instruction contains a sensing type corresponding to the target sensing task.

In some embodiments, the sensing data includes at least one of: sensing measurement data or a sensing result, where the sensing measurement data is data for determining the sensing result.

It should be noted that, when the apparatus provided in the foregoing embodiments implements functions of the apparatus, the division of various functional modules described above is taken as an example for illustration. In practice, the foregoing functions may be allocated to different functional modules for implementation according to actual requirements, that is, the structure of the device is divided into different functional modules to implement all or some of the foregoing functions.

With respect to the apparatus in the foregoing embodiments, the manner in which the modules perform the operations has been described in detail in the embodiments related to the method, and will not be described in detail again herein.

Figure 12:
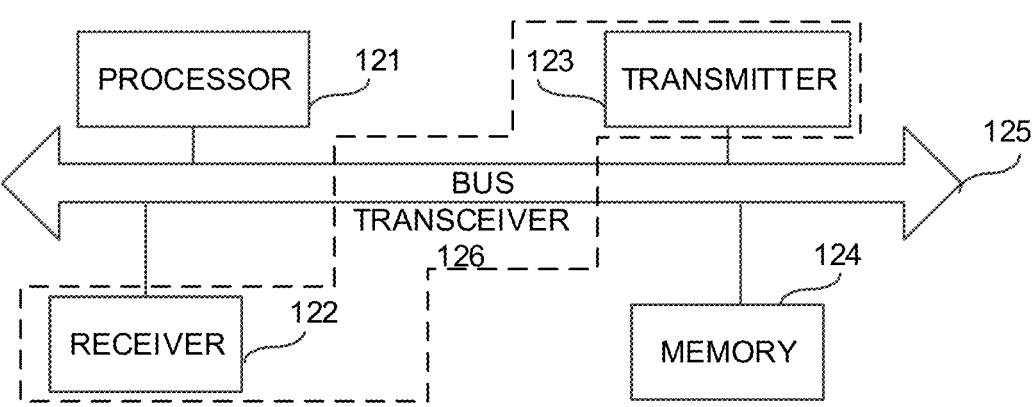
FIG. 12 is a schematic structural diagram of a device provided in an embodiment of the disclosure.

Referring to FIG. 12, FIG. 12 is a schematic structural diagram of a device 120 provided in an embodiment of the disclosure. The device 120 may include a processor 121, a receiver 122, a transmitter 123, a memory 124, and a bus 125.

The processor 121 includes one or more processing cores. The processor 121 is configured to execute various function applications and perform information processing by running software programs and modules.

The receiver 122 and transmitter 123 may be implemented as a transceiver 126, where the transceiver 126 may be a communication chip.

The memory 124 is connected to the processor 121 via a bus 125.

The memory 124 may be configured to store computer programs, and the processor 121 is configured to execute the computer programs to implement the foregoing method for sensing control.

In addition, the memory 124 may be implemented by any type of volatile storage device or non-volatile storage device or a combination thereof. The volatile storage device or non-volatile storage device includes, but is not limited to, a random-access memory (RAM), a read-only memory (ROM), an erasable programmable ROM (EPROM), an electrically EPROM (EEPROM), a flash memory or other solid state storage devices, a compact disc ROM (CD-ROM), a digital video disc (DVD) or other optical storage, a magnetic cassette, a magnetic tape, magnetic disk storage, or other magnetic storage devices.

Specifically, when the device 120 is the first core network element described above, the processor 121 executes the computer programs stored in the memory 124 to implement the foregoing method for sensing control at a first core network element side. When the device 120 is the second core network element described above, the processor 121 executes the computer programs stored in the memory 124 to implement the foregoing method for sensing control at a second core network element side. When the device 120 is the access-network apparatus described above, the processor 121 executes the computer programs stored in the memory 124 to implement the foregoing method for sensing control at an access-network device side. When the device 120 is the terminal device described above, the processor 121 executes the computer programs stored in the memory 124 to implement the foregoing method for sensing control at a terminal device side.

For details not elaborated in the embodiment, reference can be made to the foregoing embodiments, which will not be described in detail again herein.

Embodiments of the disclosure further provide a system for sensing control. The system includes a first core network element, a second core network element, an access-network device, and a target terminal device. The first core network element is configured to perform the foregoing method at a first core network element side. The second core network element is configured to perform the foregoing method at a second core network element side. The access-network device is configured to perform the foregoing method at an access-network device side. The target terminal device is configured to perform the foregoing method at a target terminal device side.

Embodiments of the disclosure further provide a computer-readable storage medium. The storage medium is configured to store computer programs. The computer programs are configured to be executed by a processor to implement the foregoing method at a first core network element side, or the foregoing method at a second core network element side, or the foregoing method at an access-network device side, or the foregoing method at a target terminal device side. Optionally, the computer-readable storage medium may include a ROM, a RAM, a solid state drive (SSD), or an optical disk. The RAM may include a resistance RAM (ReRAM) and a Dynamic RAM (DRAM).

Embodiments of the disclosure further provide a chip. The chip includes a programmable logic circuit and/or program instructions. The chip is configured to, when running, implement the foregoing method at a first core network element side, or the foregoing method at a second core network element side, or the foregoing method at an access-network device side, or the foregoing method at a target terminal device side.

Embodiments of the disclosure further provide a computer program product or a computer program. The computer program product or the computer program includes computer instructions. The computer instructions are stored in a computer-readable storage medium and configured to be read and executed by a processor, so as to implement the foregoing method at a first core network element side, or the foregoing method at a second core network element side, or the foregoing method at an access-network device side, or the foregoing method at a target terminal device side.

It should be understood that, "indication" referred to in embodiments of the disclosure may be a direct indication, may be an indirect indication, or may mean that there is an association. For example, A indicates B may mean that A directly indicates B, for instance, B can be obtained according to A; may mean that A indirectly indicates B, for instance, A indicates C, and B can be obtained according to C; or may mean that that there is an association between A and B.

In the elaborations of embodiments of the disclosure, the term "correspondence" may mean that there is a direct or indirect correspondence between the two, may mean that there is an association between the two, or may mean a relationship of indicating and indicated or configuring and configured, etc.

In some embodiments of the disclosure, the "pre-defined" can be implemented by pre-saving a corresponding code or table in a device (for example, including the terminal device and the network device) or in other manners that can be used for indicating related information, and the disclosure is not limited in this regard. For example, the "pre-defined" may mean defined in a protocol.

In some embodiments of the disclosure, the "protocol" may refer to a communication standard protocol, which may include, for example, an LTE protocol, an NR protocol, and a protocol applied to a future communication system, and the disclosure is not limited in this regard.

The "multiple" referred to herein refers to two or more than two. The "and/or" describes an association between associated objects, which means that there may be three relationships. For example, A and/or B may mean A alone, both A and B exist, and B alone. The character "/" generally indicates that the associated objects are in an "or" relationship.

In addition, the serial numbers of the steps described herein merely exemplarily illustrate a possible execution order between the steps. In some other embodiments, the foregoing steps may not be executed according to the order of the serial numbers, for example, two steps with different serial numbers are performed simultaneously, or two steps with different serial numbers are executed performed to an order opposite to that illustrated in the figure, and embodiments of the disclosure are not limited in this regard.

Those skilled in the art should appreciate that, in one or more of the foregoing examples, the functions described in the embodiments of the disclosure may be implemented by hardware, software, firmware, or any combination thereof. When implemented by software, the functions may be stored in a computer-readable medium or transmitted as one or more instructions or codes on a computer-readable medium. The computer-readable medium includes a computer storage medium and a communication medium, where the communication medium includes any medium that facilitates transfer of computer programs from one place to another, and the storage medium may be any usable medium that can be accessed by a general purpose computer or a special purpose computer.

The foregoing elaborations are merely exemplary embodiments of the disclosure, but are not intended to limit the disclosure. Any modification, equivalent replacement, and improvement made within the spirit and principle of the disclosure shall belong to the protection scope of the disclosure.

We claim:
1. A core network element, comprising:
a transceiver;
a memory configured to store computer programs; and
a processor coupled to the transceiver and configured to execute the computer programs stored in the memory to:
cause the transceiver to receive a first sensing instruction from a first core network element, wherein the first sensing instruction instructs the core network element to control an access-network device and/or a terminal device to perform a target sensing task; and
control, according to the first sensing instruction, the access-network device and/or the terminal device to perform the target sensing task.
2. The core network element of claim 1, wherein the first sensing instruction contains second area information, and the second area information indicates a second target area that needs to be sensed by the core network element.
3. The core network element of claim 2, wherein the processor configured to control, according to the first sensing instruction, the access-network device and/or the terminal device to perform the target sensing task is configured to:
select one or more access-network devices that serve the second target area; and
cause the transceiver to send a second sensing instruction to the selected access-network device, wherein the second sensing instruction instructs the access-network device to perform a sensing operation.
4. The core network element of claim 3, wherein the second sensing instruction contains third area information, and the third area information indicates a third target area that needs to be sensed by the access-network device.
5. The core network element of claim 1, wherein the first sensing instruction contains identity (ID) information of a target terminal device.
6. The core network element of claim 5, wherein the processor configured to control, according to the first sensing instruction, the access-network device and/or the terminal device to perform the target sensing task is configured to:
cause the transceiver to send a third sensing instruction to an access-network device that serves the target terminal device, in response to determining to enable the access-network device to perform the target sensing task, wherein the third sensing instruction instructs the access-network device to perform a sensing operation on the target terminal device.
7. The core network element of claim 6, wherein the processor is further configured to:
indicate the target terminal device to the access-network device by carrying the ID information of the target terminal device in the third sensing instruction; or
indicate the target terminal device to the access-network device through a terminal-level signaling interaction connection maintained between the core network element and the access-network device.
8. The core network element of claim 6, wherein the third sensing instruction contains the sensing type corresponding to the target sensing task.
9. The core network element of claim 5, wherein the processor configured to control, according to the first sensing instruction, the access-network device and/or the terminal device to perform the target sensing task is configured to:
control the transceiver to send a fourth sensing instruction to the target terminal device in response to determining to enable the terminal device to perform the target sensing task, wherein the fourth sensing instruction instructs the target terminal device to perform a sensing operation.
10. The core network element of claim 9, wherein the fourth sensing instruction is sent through a non-access stratum (NAS) message.
11. The core network element of claim 9, wherein the fourth sensing instruction contains the sensing type corresponding to the target sensing task.
12. An access-network device, comprising:
a transceiver;
a memory configured to store computer programs; and
a processor coupled to the transceiver and configured to execute the computer programs stored in the memory to:
cause the transceiver to receive a target sensing instruction from a second core network element, wherein the target sensing instruction instructs the access-network device to perform a sensing operation related to a target sensing task; and
perform the sensing operation according to the target sensing instruction to obtain sensing data related to the target sensing task.
13. The access-network device of claim 12, wherein the target sensing instruction contains third area information, and the third area information indicates a third target area that needs to be sensed by the access-network device.
14. The access-network device of claim 13, wherein the processor, in performing the sensing operation according to the target sensing instruction to obtain the sensing data related to the target sensing task, is configured to:
determine sensing data for the third target area according to radio signal measurement of the access-network device itself and/or radio signal measurement of a secondary node.
15. The access-network device of claim 14, wherein the processor is further configured to:
select, according to secondary node selection reference information, a secondary node for obtaining the sensing data for the third target area;
wherein the secondary node selection reference information comprises at least one of: sensing capabilities of other access-network devices adjacent to the access-network device, a sensing capability of a terminal device connected to the access-network device, or a sensing permission of a terminal device connected to the access-network device.
16. The access-network device of claim 12, wherein the sensing data comprises at least one of: sensing measurement data or a sensing result, wherein the sensing measurement data is data for determining the sensing result.
17. A terminal device, being a target terminal device and comprising:
a transceiver;
a memory configured to store computer programs; and a processor coupled to the transceiver and configured to execute the computer programs stored in the memory to:

cause the transceiver to receive a fourth sensing instruction from a second core network element, wherein the fourth sensing instruction instructs the target terminal device to perform a sensing operation; and perform the sensing operation according to the fourth sensing instruction to obtain sensing data related to a target sensing task.

18. The terminal device of claim 17, wherein the fourth sensing instruction is sent through a non-access stratum (NAS) message.

19. The terminal device of claim 17, wherein the fourth sensing instruction contains a sensing type corresponding to the target sensing task.

20. The terminal device of claim 17, wherein the sensing data comprises at least one of: sensing measurement data or a sensing result, wherein the sensing measurement data is data for determining the sensing result.

\* \* \* \* \*